United States Patent Office 2,951,098
Patented Aug. 30, 1960

2,951,098

ADDUCT OF HEXACHLOROCYCLOPENTADIENE WITH 1,4-DICHLOROBUTYNE-2

Paul E. Hoch, Youngstown, N.Y., and John M. Clegg, Auburndale, Mass.; said Hoch assignor to Hooker Chemical Corporation, Niagara Falls, N.Y., a corporation of New York No Drawing. Filed July 14, 1958, Ser. No. 748,135

1 Claim. (Cl. 260—648)

This invention relates to a new composition of matter prepared by the addition of an unsaturated chlorinated compound to hexachlorocyclopentadiene.

More specifically this invention resides in the addition of 1,4-dichlorobutene-2 or 1,4-dichlorobutyne-2 to hexachlorocyclopentadiene to form new compositions of matter. The compound formed when 1,4-dichlorobutene-2 was added to hexachlorocyclopentadiene was 1,2,3,4,7,7-hexachloro - 5,6 - bis(chloromethyl)bicyclo - (2.2.1)-heptene-2. The compound formed when 1,4-dichlorobutyne-2 was added to hexachlorocyclopentadiene was 1,2,3,4,-7,7-hexachloro - 5,6 - bis(chloromethyl)bicyclo - (2.2.1)-heptadiene-2,5.

The reactions are as follows:

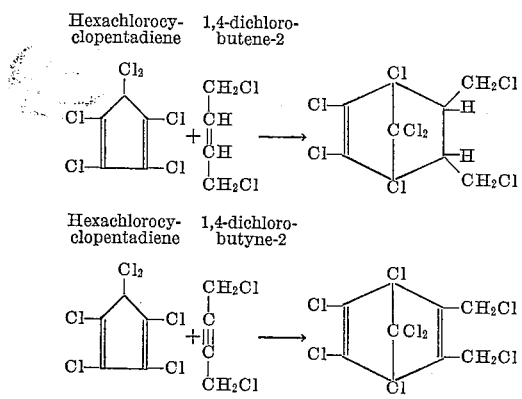

It was unexpected and surprising to find that by adding 1,4-dichlorobutene-2 to hexachlorocyclopentadiene and by adding 1,4-dichlorobutyne-2 to hexachlorocyclopentadiene relatively high yields of the product were obtained. The prior art teachings indicated that when unsaturated chlorinated compounds are added to hexachlorocyclopentadiene, product yields are relatively low. For example, an article by C. W. Roberts entitled, "Chemistry of Hexachlorocyclopentadiene" (Chemistry and Industry, February 1, 1958, pages 110–115) discloses that when unsaturated chlorinated compounds such as 1,2-dichloroethylene, or vinyl chloride are added to hexachlorocyclopentadiene a product of approximately twenty-five percent yield results. In contrast to this relatively low yield, applicants have found that when the dichlorobutyne is added to hexachlorocyclopentadiene, a product yield of about sixty-six percent was obtained (melting point 94–97 degrees centigrade). In the addition of the dichlorobutene to hexachlorocyclopentadiene, an extremely desirable product yield of about eighty-two point zero percent was obtained (melting point 101–102 degrees centigrade).

In preparing the compounds of this invention, a solvent may be employed and, if used, it should preferably be inert with respect to the reactants and reaction products and should have a sufficiently high boiling point to allow for reaction at elevated temperatures without necessitating the application of superatmospheric pressure. The time allowed for reaction will vary with the purity of the reactants, the degree of completion of reaction desired, the solvents employed, etc. Ordinary purification procedures known in the art such as washing, absorbent decolorization, recrystallization, etc., may be satisfactorily employed.

In the addition of 1,4-dichlorobutene-2 to hexachlorocyclopentadiene to form 1,2,3,4,7,7-hexachloro-5,6-bis(chloromethyl)bicyclo-(2.2.1)-heptene-2, the following procedure was followed.

In a one liter, three-necked flask fitted with a stirrer, thermometer and reflux condenser, was placed 273 grams (one mole) of hexachlorocyclopentadiene and 125 grams (one mole) of 1,4-dichlorobutene-2. To this was added 100 milliliters of o-dichlorobenzene as a solvent. This mixture was heated for forty-eight hours at one hundred and fifty-five degrees centigrade to one hundred and sixty-five degrees centigrade.

The reaction mixture was then distilled to yield 270 grams of adduct (about eighty-two percent) which semi-solidified on standing. From this crude mixture the solid (melting point 102 degrees centigrade) product can be isolated by recrystallization. This reaction product is in colorless crystalline form.

In the addition of 1,4-dichlorobutyne-2 to hexachlorocyclopentadiene to form 1,2,3,4,7,7-hexachloro-5,6-bis-(chloromethyl)bicyclo-(2.2.1)-heptadiene-2,5, the following procedure was followed.

In a two to three liter, three-necked flask, fitted with a stirrer, thermometer and reflux condenser, was placed 369 grams (3 moles) of 1,4-dichlorobutyne-2, 819 grams (3 moles) of hexachlorocyclopentadiene and 250 milliliters of o-dichlorobenzene. Heating was continued for ninety-four hours at one hundred sixty degrees centigrade, plus or minus five degrees centigrade.

The reaction mixture was cooled and 200 milliliters of n-hexane added. With further cooling, crystals separated out which were filtered off and washed thoroughly with n-hexane and dried. A yield of 583.2 grams (forty-nine point one percent) was obtained.

From the mother liquors, a further crop of 198.2 grams (sixteen point seven percent) was obtained.

The total amount of 1,2,3,4,7,7-hexachloro-5,6-bis-(chloromethyl)bicyclo-(2.2.1)-heptadiene-2,5 thus obtained was sixty-five point eight percent.

This reaction product is in colorless crystalline form.

It will be noted that in this process an o-dichlorobenzene solvent was used to moderate the temperature.

The 1,4-dichlorobutyne-2 reaction product with hexachlorocyclopentadiene is of greater utility as an intermediate than is the dichloro-butene reaction product. This is true since the chlorines of the side chain in the dichloro-butyne are more reactive, therefore the dichloro-butyne product will be more reactive. The double bond also between the second and third position of the dichloro-butyne product makes it more reactive than the second and third single bond of the dichloro-butene. All the compounds of this invention have utility as insecticides. Combinations of the compositions of this invention with other known insecticides, pesticides, or herbicides to obtain desirable combinations and properties are within the spirit of this invention.

The examples of the compositions of our invention, and methods of preparing and utilizing them which have been described in the foregoing specification, have been given for purposes of illustration, not limitation. Many other modifications and ramifications will naturally suggest themselves to those skilled in the art, based on the disclosure of our basic discovery. These are intended to be comprehended within the scope of our invention.

We claim:

1,2,3,4,7,7-hexachloro-5,6-bis(chloromethyl)bicyclo-(2.2.1)-heptadiene-2,5.

References Cited in the file of this patent

UNITED STATES PATENTS 2,905,725  Schmerling _____ Sept. 22, 1959

OTHER REFERENCES

Fields: Jour. Amer. Chem. Soc., 76, 2709–10 (1954).
Farbauerke: German application 1,002,341, printed Feb. 14, 1957 (Kl. 12025).